US009932964B2

(12) United States Patent
Janβen et al.

(10) Patent No.: US 9,932,964 B2
(45) Date of Patent: Apr. 3, 2018

(54) WIND TURBINE AND METHOD OF OPERATING A WIND TURBINE

(71) Applicant: LELY PATENT N.V., Maassluis (NL)

(72) Inventors: Gerriet Thomas Janβen, Südbrookmerland (DE); Andre Uwe Schlink, Leer (DE)

(73) Assignee: LELY PATENT N.V., Maassluis (NL)

( * ) Notice: Subject to any disclaimer, the term of this patent is extended or adjusted under 35 U.S.C. 154(b) by 319 days.

(21) Appl. No.: 14/935,487

(22) Filed: Nov. 9, 2015

(65) Prior Publication Data

US 2016/0131106 A1     May 12, 2016

(30) Foreign Application Priority Data

Nov. 7, 2014   (NL) ...................................... 2013753

(51) Int. Cl.

| F03D 1/00 | (2006.01) |
|---|---|
| F03D 7/02 | (2006.01) |
| F03D 1/06 | (2006.01) |
| F03D 7/04 | (2006.01) |
| F03D 9/25 | (2016.01) |

(Continued)

(52) U.S. Cl.
CPC ......... *F03D 7/0204* (2013.01); *F03D 1/0675* (2013.01); *F03D 7/0248* (2013.01); *F03D 7/0268* (2013.01); *F03D 7/042* (2013.01); *F03D 9/25* (2016.05); *F03D 17/00* (2016.05); *F03D 80/82* (2016.05); *F05B 2260/4031* (2013.01); *F05B 2260/902* (2013.01);

(Continued)

(58) Field of Classification Search
CPC ...... F03D 7/0204; F03D 7/0248; F03D 7/042; F05B 2260/4031; F05B 2260/902; F05B 2270/331; Y02E 10/723
See application file for complete search history.

(56) References Cited

U.S. PATENT DOCUMENTS

| 4,517,506 A | * | 5/1985 | Heinrich ............... B25B 23/147 |
|---|---|---|---|
| | | | 318/432 |
| 6,945,752 B1 | | 9/2005 | Wobben |

(Continued)

FOREIGN PATENT DOCUMENTS

| EP | 2290230 A2 | 3/2011 |
|---|---|---|
| EP | 2495435 A1 | 9/2012 |

OTHER PUBLICATIONS

Search Report for priority document NL2013753 dated Jul. 16, 2015.
Siemens AG, "Yaw Systems", Aug. 30, 2012.

*Primary Examiner* — Ninh H Nguyen
(74) *Attorney, Agent, or Firm* — Hoyng Rokh Monegier LLP; Ramin Amirsehhi; David P. Owen

(57) ABSTRACT

Wind turbine comprising a nacelle with a generator and wind turbine blades for driving the generator, a tower supporting the nacelle wherein the nacelle is rotatable about a vertical axis an azimuth drive for rotating the nacelle around the axis, said azimuth drive comprising a plurality of asynchronous yaw motors and an azimuth controller with a frequency unit for controlling the plurality of asynchronous yaw motors, wherein the azimuth controller is arranged to connect all of the plurality of asynchronous yaw motors to the one frequency unit in a rotating mode and to connect only a subset of the plurality of asynchronous yaw motors from the one frequency unit in a locking mode.

16 Claims, 4 Drawing Sheets

(51) Int. Cl.
    *F03D 80/80*         (2016.01)
    *F03D 17/00*         (2016.01)

(52) U.S. Cl.
    CPC ....... *F05B 2270/331* (2013.01); *Y02E 10/721* (2013.01); *Y02E 10/723* (2013.01)

(56) References Cited

U.S. PATENT DOCUMENTS

| | | | | |
|---|---|---|---|---|
| 7,944,070 | B2* | 5/2011 | Rosenvard | F03D 7/0204 290/44 |
| 8,075,266 | B2* | 12/2011 | Keller | F03D 7/0204 416/37 |
| 8,550,769 | B2* | 10/2013 | Behnke | F03D 7/0204 415/1 |
| 8,647,060 | B2 | 2/2014 | Yoshida | |
| 2010/0220508 | A1* | 9/2010 | Oesterlein | H02J 7/35 363/131 |

* cited by examiner

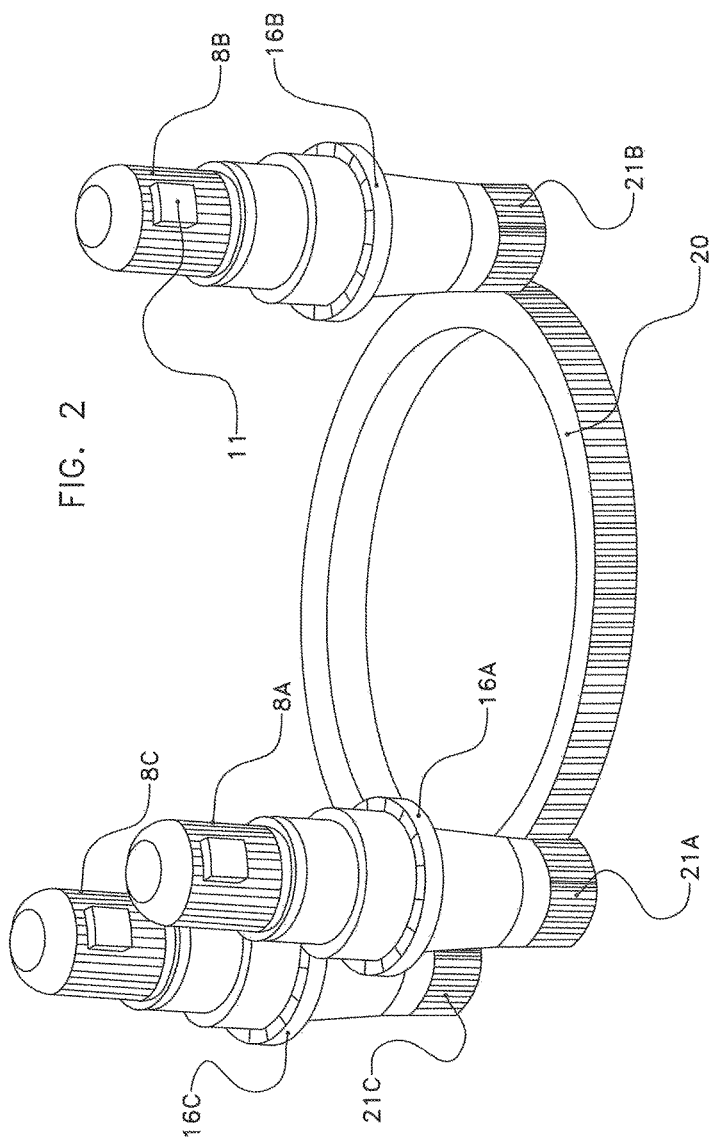

WIND TURBINE AND METHOD OF OPERATING A WIND TURBINE

CROSS REFERENCE TO RELATED APPLICATIONS

This application claims priority from NL application number 2013753 filed on 7 Nov. 2014. This application is hereby incorporated by reference in its entirety.

BACKGROUND OF THE INVENTION

1. Field of the Invention

The invention relates to a wind turbine and to a method for operating such a wind turbine.

2. Description of the Related Art

EP2290230 discloses a wind turbine with yaw motors for turning the nacelle of the wind turbine. Each yaw motor has its own controller which can communicate with another controller. The yaw motors are controlled in such a way that all motors apply the same torque. The plurality of controllers and communication lines makes this configuration expensive and susceptible for failures.

U.S. Pat. No. 8,647,060 discloses a wind turbine with a plurality of yaw motors for turning the nacelle into a desired orientation. When a new position has been reached the yaw motors are stopped in a certain order after a specific amount of time, to minimize backlash in the azimuth drive. This specific amount of time is not adapted to the situation at the moment the desired direction has been reached. The yaw motor may have been activated too long without turning effect which may have damaged the motor.

BRIEF SUMMARY OF THE INVENTION

It is an object of the invention to overcome the above mentioned drawbacks and to provide a wind turbine with a simple and robust azimuth drive.

This is achieved by a wind turbine comprising a nacelle with a generator and wind turbine blades for driving the generator, a tower supporting the nacelle, wherein the nacelle is rotatable about a vertical axis, an azimuth drive for rotating the nacelle around the axis, said azimuth drive comprising a plurality of asynchronous yaw motors and an azimuth controller with a frequency unit for controlling the yaw motors, wherein the azimuth controller is arranged to connect all yaw motors to the one frequency unit in a rotating mode and to connect only a subset of the yaw motors from the one frequency unit in a locking mode. By means of the invention, all yaw motors are in the rotating mode used for turning the nacelle which provides maximum turning power. Only a subset of the yaw motors are used for additionally locking the nacelle in the locking mode. In general, frequency units are quite expensive electronic control systems. By using one frequency unit for controlling more than one, in particular all, yaw motors for both, the rotating mode and the locking mode, a relatively cheap solution is obtained.

In an embodiment of the invention, a switch is provided between at least one yaw motor and the frequency unit. A switch makes is possible to easily electrically disengage a yaw motor.

In a further embodiment according to the invention, the subset comprises a torque sensor for emitting a torque signal. Preferably, the torque sensor comprises a rotation sensor on the respective yaw motor and a power sensor for measuring the power of the current leading to the respective yaw motor. This way of measuring the torque gives an accurate measurement as torque is directly derivable from the power the motor is using and the number of rotations of the motor.

In an embodiment according to the invention, the azimuth controller comprises a comparing device for comparing the torque signal with a torque threshold and for transmitting a locking signal to the frequency unit when the measured torque exceeds the torque threshold, and the frequency unit is provided with a switch which is opened by the locking signal. In this way the yaw motor is deactivated. In general, the gear between the yaw motor and the gear wheel of the nacelle has a very large gear ratio. Therefore, an opposite movement, that means, a rotation of the nacelle transferred to the motor, creates a very large momentum and is virtually impossible. Therefore, an open switch causes that the yaw motor is neutral and therefore functions as a brake.

In an alternative embodiment according to the invention, the azimuth controller comprises a comparing device for comparing the torque signal with a torque threshold and for transmitting a locking signal to the yaw motor of the subset when the measured torque exceeds the torque threshold and said yaw motor comprises a brake which is activated by the a locking signal. The brake is a mechanical brake which is incorporated in the yaw motor. In this way an extra strong braking action can be performed. As an alternative, the brake can also be activated when a signal is absent. In this case, the locking signal is the absence of a control signal.

In an alternative embodiment according to the invention, the azimuth controller comprises a comparing device for comparing the torque signal with a torque threshold and for transmitting a locking signal to the frequency unit when the measured torque exceeds the torque threshold and the frequency unit is arranged to generate a locking current to the yaw motor of the subset to apply a brake torque. In this way, a constant and relatively weak force is applied to the nacelle. In this embodiment, it is favorable that a counteracting brake torque be applied by a second yaw motor. Such counteracting yaw motors function as shock absorber for wind spikes.

In a further embodiment according to the invention, the locking current is a DC current. A DC current gives a constant magnetic field, and therefore, a constant force.

In another embodiment according to the invention, the torque threshold is adjustable by the wind turbine controller according to a measured parameter like the measured wind velocity, measured wind direction, or a measured rotation velocity. High wind velocities or fluctuating wind directions induce large forces and heavy deviations and therefore a stronger absorbance is necessary. In quieter circumstances a weaker brake force induced by less electrical power is sufficient.

In an embodiment, a switch is provided between at least one yaw motor and the frequency unit.

In an embodiment, at least one yaw motor of the subset comprises a torque sensor for emitting a torque signal.

In an embodiment, the torque sensor comprises a rotation sensor on the respective yaw motor and a power sensor for measuring the power of the current leading to the respective yaw motor.

In an embodiment, the azimuth controller comprises a comparing device for comparing the torque signal with a torque threshold and for transmitting a locking signal to the frequency unit when the measured torque exceeds the torque threshold and in that the frequency unit is provided with a switch which is opened by the locking signal.

In an embodiment, the azimuth controller comprises a comparing device for comparing the torque signal with a torque threshold and for transmitting a locking signal to the yaw motor of the subset when the measured torque exceeds the torque threshold and in that said yaw motor comprises a brake which is activated by the locking signal.

The invention also relates to a method comprising the steps of connecting all yaw motors electrically to the frequency unit; generating in the operating mode a first AC current by the frequency unit and driving all yaw motors via the first current in order to turn the nacelle in a desired direction; stopping the first AC current; connecting in the locking mode only a subset of yaw motors electrically to the frequency unit; generating a second current by the frequency unit and driving the subset of yaw motors in a direction via the second current. The advantages of this method, as well as the preferred embodiments thereof, will be apparent from the discussion above with reference to the proposed apparatus.

BRIEF DESCRIPTION OF THE DRAWINGS

The features and advantages of the invention will be appreciated upon reference to the following drawings, in which:

FIG. 2 is a more detailed view of the azimuth drive of the wind turbine according to the invention.

DESCRIPTION OF ILLUSTRATIVE EMBODIMENTS

Figure 1:
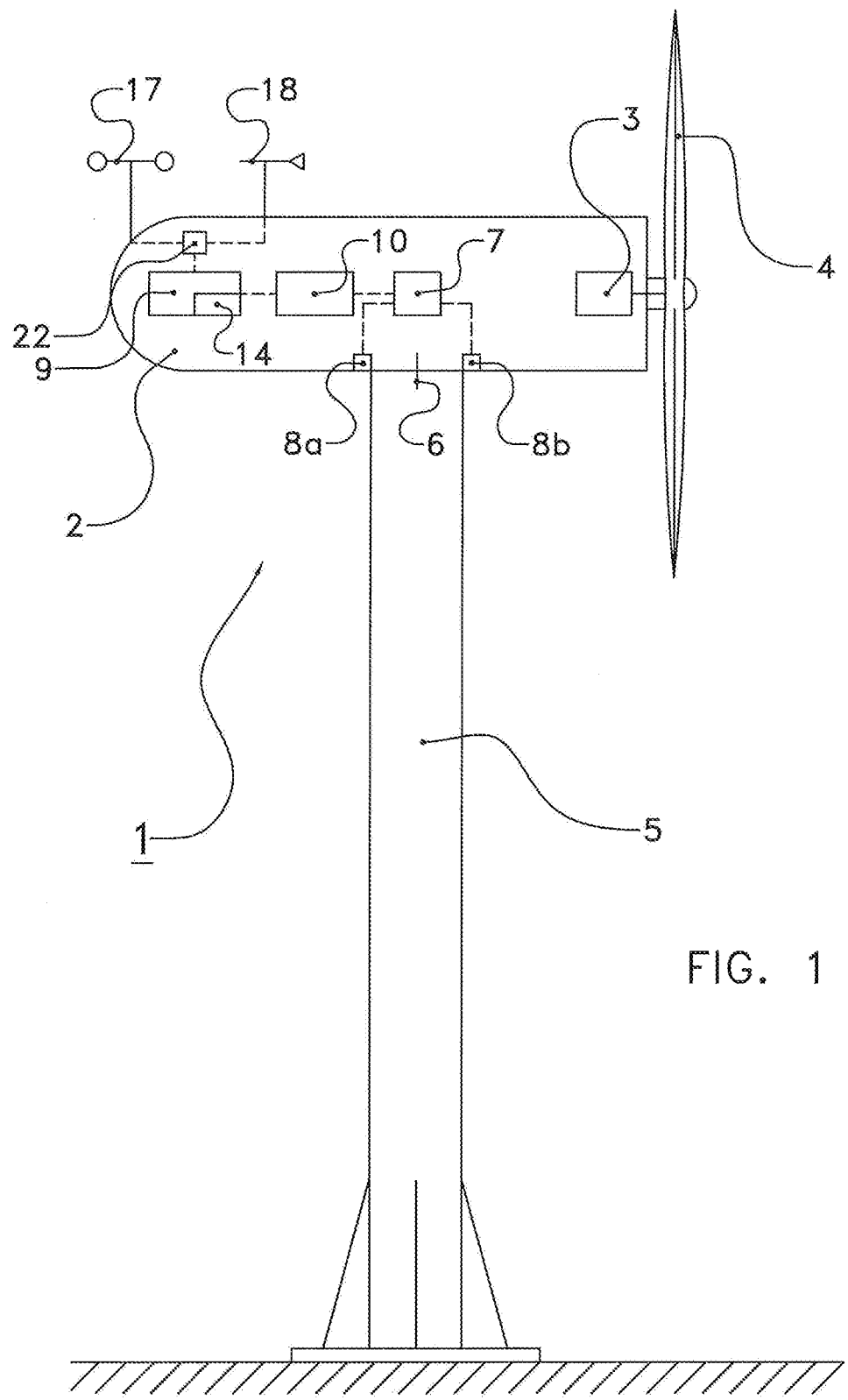
FIG. 1 is a diagrammatic view of the whole wind turbine according to the invention.

The following is a description of certain embodiments of the invention, given by way of example only and with reference to the drawings. FIG. 1 shows a wind turbine 1 comprising a nacelle 2 with a generator 3 and wind turbine blades 4 for driving the generator 3, a tower 5 supporting the nacelle 2 wherein the nacelle 2 is rotatable about a vertical axis 6, an azimuth drive 7 for rotating the nacelle 2 around the axis 6, said azimuth drive 7 comprising a plurality of asynchrous yaw motors 8A, 8B, 8C, and an azimuth controller 9 with a frequency unit 10 for controlling the at yaw motors 8A, 8B, 8C wherein the azimuth controller 9 is arranged to connect all yaw motors 8A, 8B, 8C to the one frequency unit 10 in a rotating mode and to connect only a subset of the yaw motors 8A, 8B, 8C from the one frequency unit 10 in a locking mode. At the top of the nacelle 2 a wind direction sensor 18 and a wind velocity sensor 17 are provided. Both are connected to the wind turbine controller 22.

FIG. 2 shows in more detail the azimuth drive 9. Three yaw motors, 8A, 8B, 8C attached to the nacelle 2, can drive via their yaw wheel 21A, 21B, 21C a large ring wheel 20. This ring wheel 20 is fixed to the tower 5. The ring wheel 20 is toothed at the outside, however it is also possible that the ring wheel 20 is toothed at the inner side thereof. In a not depicted embodiment the yaw motors 8A, 8B, 8C are fixed to the tower 5 and the ring wheel 20 is fixed to the nacelle 2.

Figure 4:
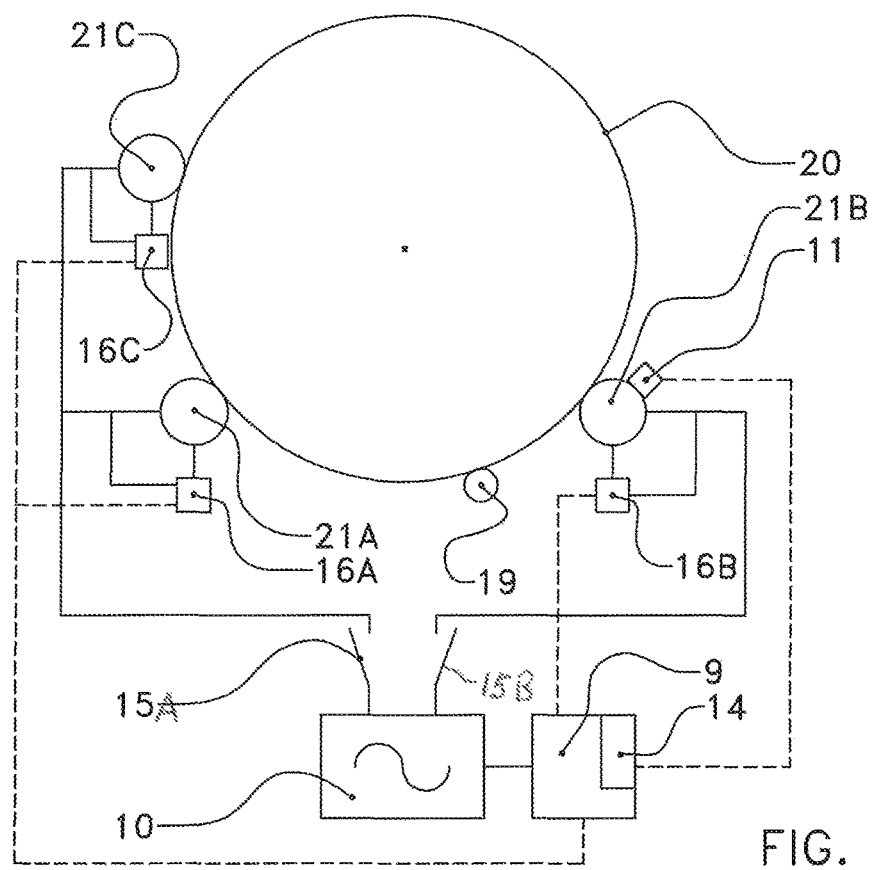
FIG. 4 is a schematic view of the control of the azimuth drive of a wind turbine according to the invention and, FIG. 5 is a graphic showing the course of the applied frequency when the nacelle is being rotated in the rotating mode and in the locking mode.

FIG. 4 shows in a more schematical way the connection of the yaw motors 8A, 8B, 8C to the frequency unit 10. A switch 15A, 15B is provided between at least one yaw motor 8A, 8B, 8C and the frequency unit 10. The frequency unit 10 is electrically connected to the azimuth drive 7. The yaw motor 8A, 8B, 8C of the subset comprises a torque sensor 11 for emitting a torque signal. This torque sensor 11 is connected to the azimuth controller 9. The azimuth controller 9 comprises a comparing device 14 for comparing the torque signal with a torque threshold and for transmitting a locking signal to the frequency unit 10 when the measured torque exceeds the torque threshold wherein the frequency unit 10 is provided with a switch which is opened by the locking signal.

Figure 5:
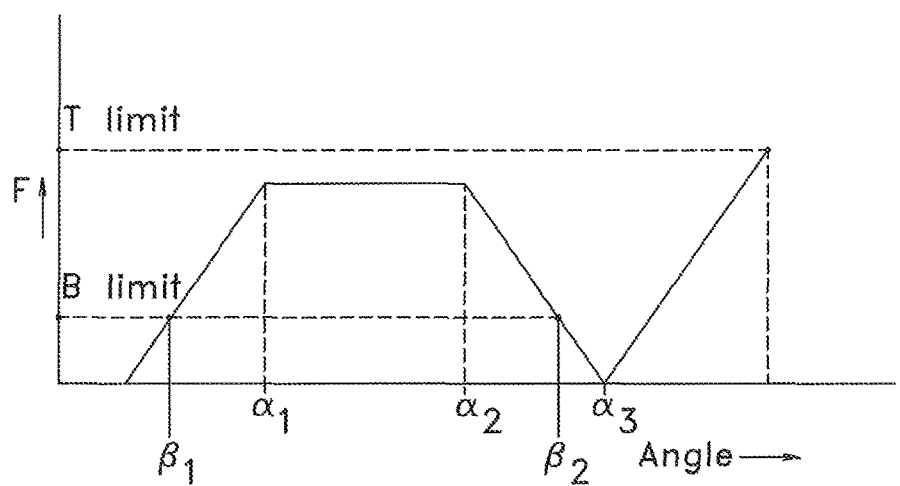

The wind turbine 1 according to the invention operates as follows:

The direction sensor 18 senses the wind direction and gives a direction signal to the central wind turbine controller 22. When this wind direction deviates more then a certain amount from the actual direction of the rotation axis of the wind turbine blades 4, the wind turbine controller 22 commands the azimuth controller 9 to turn the nacelle 2 about a certain angle α3 in the desired direction. The frequency unit 10 now closes all switches 15A, 15B in the power lines to the various yaw motors 8A, 8B, 8C of the azimuth drive 7 and all yaw motors 8A, 8B, 8C are together powered by a current with increasing frequency starting from zero. This is schematically shown in FIG. 5. When a predetermined brake frequency β1 of a low frequency of e.g. 2 Hz has been reached, the mechanical brakes 16A, 16B, 16C of all yaw motors 8A, 8B, 8C are deactivated. The signal to deactivate the brakes 16A, 16B, 16C is given by the azimuth controller 9. All yaw motors 8A, 8B, 8C will rotate with the same rotational speed. The rotational speed will follow the increasing frequency till a certain operating frequency has been reached (at angle α1, FIG. 5). The orientation of the ring wheel 20 is constantly measured by position sensor 19 and transferred to the azimuth controller 9. The yaw motors 8A, 8B, 8C will now rotate with a constant speed. At a certain angle before the desired position will be reached, at α2, the frequency decreases. When the frequency has decreased below the brake frequency of 2 Hz, the azimuth controller 9 sends a signal to the brakes 16A, 16B, 16C of the yaw motors 8A, 8B, 8C not belonging to the subset to activate. These yaw motors 8A, 8B, 8C are now mechanically locked in their position. The frequency further decreases to zero and the rotating mode has ended. The nacelle 2 is now in the desired end position.

In order to minimize backlash between the ring wheel 20 and the yaw wheels 21A, 21B, 21C the locking mode starts. Switch 15A is opened and the yaw motors 8A, 8B, 8C not belonging to the subset are disconnected from the frequency unit 10. Now the frequency unit 10 applies an AC current with an increasing frequency starting from zero (FIG. 5) and let the ring wheel 20 rotate in the same rotational direction as during the rotation mode. The torque of at the yaw motors 8A, 8B, 8C of the subset is measured by the torque sensor 11 which generates a torque signal to the comparing device 14 of the azimuth controller 9. The comparing device 14 of the azimuth controller 9 compares the torque signal with a torque threshold and transmits a locking signal to the frequency unit 10 when the measured torque exceeds the torque threshold. The frequency unit 10 opens switch 15B to the subset and the subset of yaw motors 8B is disconnected. The frequency corresponding with this halting moment is indicated in FIG. 5 by Tlimit. The yaw motor 8B of the subset comprises a brake 16B which is additionally activated by the locking signal of the comparing device 14.

In FIGS. 2 and 4 only one yaw motor 8B of the subset is depicted. However, the invention is not limited to a subset with only one yaw motor 8A, 8B, 8C and more than one yaw motor 8A, 8B, 8C might be connected via the same power line to the frequency unit 10.

The torque threshold is adjustable by the wind turbine controller 22 according to a measured parameter like the measured wind velocity, measured wind direction or a measured rotational velocity.

Figure 3A:
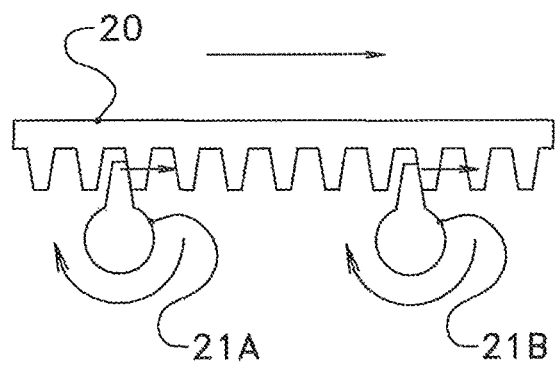
FIGS. 3A-3D are schematic diagrams of the operating state of a the azimuth drive of a wind turbine according to the invention, and illustrate the operation when stopping rotation of the nacelle.
Figure 3B:
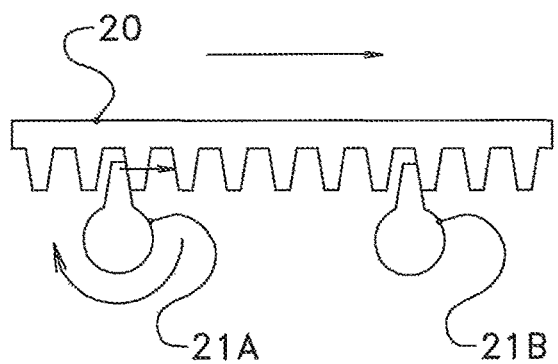
Figure 3C:
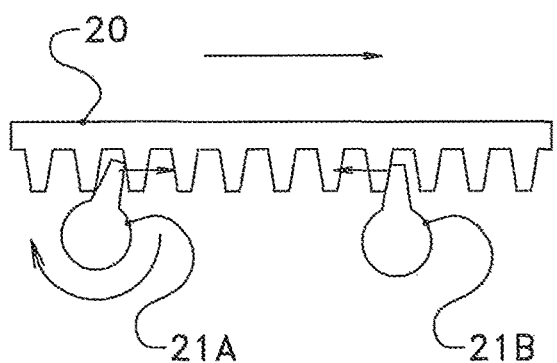

The process of minimizing the backlash will be elucidated more in detail with help of FIGS. 3A to 3D. For clarity reasons, the circular ring wheel 20 is depicted linear in FIGS. 3A to 3D. Only two yaw motors 8A, 8B, 8C are depicted, the right one not belonging to the subset and the left one belonging to the subset. Additionally for clarity reasons, only the tooth of a yaw wheel 21A, 21B, which engages the ring wheel 20, is depicted. FIG. 3A shows both yaw wheels 21A, 21B in the rotating mode wherein the rotational direction of the corresponding yaw motors is indicated by arrows. The same AC current is applied to both yaw motors 8A, 8B and they are running with the same rotational speed. The ring wheel rotates 20 in the direction of the arrow. Between the teeth of both yaw wheels 21A, 21B and the teeth of the ring wheel 20 is some free space. Although this free space is minimal, it allows the nacelle 2 to swing a bit. Such a swinging motion may cause unwanted wearing and/or vibration. When the desired orientation has been reached, the yaw motor 21B not belonging to the subset is stopped by disconnecting the frequency unit 10 from said motor 21B. The locking mode is started and the left motor is rotating with increasing frequency. This causes the ring wheel 20 to be pushed against the halted yaw wheel 21B (FIG. 3C). Now the torque induced in the yaw motor 8A of the subset attached to said yaw wheel 21A, will rapidly increase. When the measured torque in this yaw motor 8A, measured by the torque sensor 11, exceeds the threshold, the frequency unit 10 stops this yaw motor 8A. Now both yaw wheels 21A, 21B firmly hold the ring wheel 20 (FIG. 3D) without backlash.

Figure 3D:
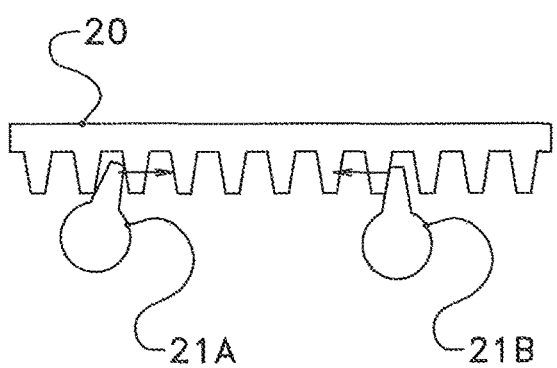

In the above described embodiment, the yaw motors 8A, 8B connected to both yaw wheels 21A, 21B are not activated in the locking position (FIG. 3D). In an alternative embodiment, the azimuth controller 9 comprises a comparing device 14 for comparing the torque signal with a torque threshold and for transmitting a locking signal to the frequency unit 10 when the measured torque exceeds the torque threshold and is the frequency unit 10 arranged to generate a locking current to the yaw motor 8A of the subset to apply a brake torque. Yaw wheel 21A exerts in this way a constant force in the direction of the arrow. The locking current is a DC current. This DC current can easily be generated by only applying one out of 3 phases of the AC current.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A wind turbine comprising a nacelle with a generator, and wind turbine blades for driving the generator,
    a tower supporting the nacelle wherein the nacelle is rotatable about a vertical axis,
    an azimuth drive for rotating the nacelle about the axis, said azimuth drive comprising a plurality of asynchronous yaw motors and an azimuth controller with a frequency unit for controlling the yaw motors,
    wherein the azimuth controller is arranged to connect the plurality of asynchronous yaw motors to the frequency unit in a rotating mode and to connect only a subset of the plurality of asynchronous yaw motors to the frequency unit in a locking mode.

2. A wind turbine according claim 1, wherein a switch is provided between at least one of the plurality of asynchronous yaw motors and the frequency unit.

3. A wind turbine according to claim 1, wherein the at least one yaw motor of the subset of the plurality of asynchronous yaw motors comprises a torque sensor for emitting a torque signal.

4. A wind turbine according claim 3, wherein the torque sensor comprises a rotation sensor on the respective yaw motor and a power sensor for measuring the power of the current leading to the respective yaw motor.

5. A wind turbine according claim 3, wherein the azimuth controller comprises a comparing device for comparing the torque signal with a torque threshold and for transmitting a locking signal to the frequency unit when the measured torque exceeds the torque threshold and in that the frequency unit is provided with a switch which is opened by the locking signal.

6. A wind turbine according to claim 5, wherein the torque threshold is adjustable by the wind turbine controller according a measured parameter like the measured wind velocity, measured wind direction or a measured rotation velocity.

7. A wind turbine according claim 3, wherein the azimuth controller comprises a comparing device for comparing the torque signal with a torque threshold and for transmitting a locking signal to the yaw motor of the subset when the measured torque exceeds the torque threshold and in that said yaw motor comprises a brake which is activated by the locking signal.

8. A wind turbine according claim 3, wherein the azimuth controller comprises a comparing device for comparing the torque signal with a torque threshold and for transmitting a locking signal to the frequency unit when the measured torque exceeds the torque threshold, and wherein the frequency unit is arranged to generate a locking current to the yaw motor of the subset to apply a brake torque.

9. A wind turbine according claim 8, wherein the locking current is a DC current.

10. A method for operating a wind turbine according to claim 1, comprising the steps of:
    connecting all of a plurality of asynchronous yaw motors electrically to a frequency unit;
    generating in the operating mode a first AC current by the frequency unit and driving all of the plurality of asynchronous yaw motors via the first AC current in order to turn the nacelle in a desired direction;
    stopping the first AC current;
    connecting in the locking mode only a subset of the plurality of asynchronous yaw motors electrically to the frequency unit;
    generating a second current by the frequency unit;
    and driving the subset of yaw motors in a direction via the second current.

11. The method according to claim 10, wherein the direction is the same direction as the desired direction.

12. The method according to claim 10, wherein the second current is an AC current.

13. The method according to claim 10, further comprising the steps of measuring the torque of at least one of the plurality of asynchronous yaw motors of the subset, comparing the torque with a threshold and activating the brake of said yaw motor.

14. The method according to claim 10, further comprising the steps of measuring the torque in at least one of the plurality of asynchronous yaw motors of the subset; comparing the torque with a threshold and generating a locking current by the frequency unit in order to apply a brake torque by the respective yaw motor.

15. The method according to claim 14, wherein the locking current is a DC current.

16. The method according to claim 10, further comprising the steps of measuring the torque of at least one of the plurality of asynchronous yaw motors of the subset; comparing the torque with a threshold, and halting the at least one of the plurality of asynchronous yaw motors when the measured torque exceeds the threshold.

* * * * *